United States Patent Office 3,299,118
Patented Jan. 17, 1967

3,299,118
PRODUCTION OF ε-HALONITRILES BY THE 1,4-ADDITION OF AN α-HALONITRILE TO A CONJUGATED DIENE
Harvey S. Klein, Berkeley, and Frederick F. Rust, Orinda, Calif., assignors to Shell Oil Company, New York, N.Y., a corporation of Delaware
No Drawing. Filed Aug. 12, 1963, Ser. No. 301,646
12 Claims. (Cl. 260—465.7)

This invention relates to a novel process for the production of unsaturated halogen-containing nitriles and to novel compounds obtained thereby. More particularly, it relates to a process for the 1,4-addition of halonitriles to conjugated dienes and to novel unsaturated halonitriles thus produced.

Few methods are available in the art for the production of unsaturated halogen-containing nitriles. One method for the production of such compounds comprises the direct halogenation of unsaturated hydrocarbon nitriles. The utility of such a method is restricted, however, by the limited availablility of the nitrile reactant, and the mixture of halogenation products produced, particularly when an unsaturated polyhalonitrile is desired. It would be of considerable advantage to provide a process whereby mono- to polyhalo unsaturated nitriles are readily produced with a high selectivity.

It is an object of the present invention to provide a novel process for the production of halogen-containing nitriles and the novel compounds obtained thereby. A further object is to provide a novel process for the conjugate addition of α-halonitriles to 1,3-diene systems to produce unsaturated nitriles possessing reactive halogen substituents. An additional object is to provide novel α,ε-halo-γ-unsaturated nitriles.

It has now been found that these objects are accomplished by the process of reacting α-(mono- to trihalo) substituted nitriles with a conjugated diene in the presence of certain metallic compounds as catalyst to produce a ε-halo-γ-alkenyl nitrile with from 0 to 2 α-halo substitutents as a 1,4-addition product. The term "alkenyl" as used herein is meant to include otherwise unsubstituted hydrocarbenyl and substituted hydrocarbenyl.

The metallic compounds found to be useful in the process of the invention are compounds of iron, particularly salts comprising iron cations, either in the ferrous or ferric oxidation state, and simple anions, organic or inorganic. Although iron compounds such as the nitrate, sulfate, acetate and the like are operable, best results are obtained when the catalyst is a halide, e.g., fluoride, chloride, bromide or iodide. Preferred, however, are iron halides wherein the halogen has an atomic number from 17 to 53, that is, the halogens chlorine, bromine and iodine. Although in general, ferrous salts are preferred over the corresponding ferric salts, in most cases, ferric salts give satisfactory results. Particularly preferred as catalyst is ferrous chloride.

The iron compound is employed in catalytic amounts. While the optimum amounts of catalyst will depend upon the particular diene and halonitrile reactants employed, amounts of catalyst from about 0.005 mole to about 0.5 mole per mole of limiting reactant are generally satisfactory, while amounts of catalyst from about 0.05 mole to about 0.2 mole per mole of limiting reactant are preferred.

The halonitrile reactant contains from 1 to 3 halogen substituents on the carbon atom alpha to the cyano substituent. Preferred halonitries are primary mono-nitriles, that is, contain a single cyano substituent which is attached to a primary carbon atom, are halohydrocarbon nitriles containing only atoms of hydrogen, carbon and halogen in addition to the nitrogen moiety of the cyano group, contain from 2 to 10 carbon atoms and are represented by the formula

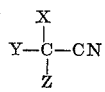

wherein X is halogen, Y represents hydrogen or X, and Z represents Y or an aliphatic organic radical.

In the above-depicted formula, X represents halogen, e.g., fluorine, chlorine, bromine and iodine. Preferred X groups, however, are halogens having an atomic number from 17 to 53. Particularly preferred as halogen in the halonitrile reactant is chlorine.

When the term Z represents an aliphatic organic radical, it is preferred that Z contain from 1 to 8 carbon atoms. Suitable Z radicals are saturated or ethylenically unsaturated, but preferably contain no acetylenic unsaturation. The Z group may be hydrocarbyl or substituted hydrocarbyl, but when substituted it is preferred that the Z group be halohydrocarbyl. Preferred aliphatic, preferably acyclic, organic Z radicals are therefore saturated or ethylenically unsaturated hydrocarbyl or halohydrocarbyl radicals. Illustrative saturated hydrocarbyl Z groups are methyl, ethyl, propyl, butyl, isobutyl, amyl, hexyl and 2-ethyhexyl radicals, while saturated halohydrocarbyl groups are illustrated by 2-chloroethyl, 4-bromobutyl, 6-chlorohexyl, 3-iodooctyl, 2-chloropropyl and 5-bromohexyl. Exemplary Z groups that are ethylenically unsaturated include hydrocarbenyl radicals such as 2-butenyl, 4-octenyl, 2-methylhexenyl and 2-pentenyl radicals, while illustrative halohydrocarbenyl Z groups include 4-chloro-2-butenyl, 2,4-dichloro-2-butenyl, 4-bromo-2-methyl-2-butenyl, 4-iodo-3-hexenyl, 5-bromo-4-heptenyl, 3-chloro-4-pentenyl and 6-chloro-3-octenyl radicals.

As the preferred halonitrile reactants in the process of the invention are haloacetonitriles, most preferred are the compounds wherein Z is hydrogen or halogen, i.e., the Y group in the above-depicted formula. Illustrative of the most preferred halonitrile reactants are chloroacetonitrile, dichloroacetonitrile, trichloroacetonitrile and the corresponding bromo and iodo derivatives.

The halonitrile is reacted with an organic conjugated diene. The diene moiety is contained in an acyclic or an alicyclic system and contains terminal or internal olefinic linkages, or both. Preferred conjugated dienes have from 4 to 20 carbon atoms and are hydrocarbyl or halohydrocarbyl dienes possessing hydrogen, halogen, hydrocarbyl or halohydrocarbyl substituents upon the basic four-carbon diene structure. Such preferred dienes are represented by the formula

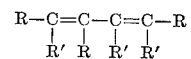

wherein R and R' independently are hydrogen, halogen, preferably halogen having an atomic number from 17 to 53, i.e., the halogens chlorine, bromine and iodine, and haloalkyl or alkyl radicals having from 1 to 8 carbon atoms, with the proviso that an R together with an R' may form a divalent alkylene radical having from 1 to 8 carbon atoms.

Illustrative acyclic conjugated dienes include butadiene, isoprene, chloroprene, 2,3-dimethylbutadiene, 1,3-hexadiene, 3-bromo-1,3-octadiene, 3,5-diethyl-4-methyl-1,3-hexadiene, 4-chloro-1,3-pentadiene, 4-iodo-2,4-heptadiene and 2,3-dichlorobutadiene. Exemplary alicyclic dienes are those dienes wherein at least one carbon atom of at least one olefinic linkage is a portion of a carbocyclic ring, such as 1,3-cyclohexadiene, cyclopentadiene, 2-methylcyclopentadiene, 5-ethyl-1,3-cyclohexadiene, 4-bromo- 1,3-cyclohexadiene, 3-methylenecyclohexene, 1,3-cyclooctadiene, 1,2-dimethylenecyclohexane and 4-chloro-1,3-cycloheptadiene.

Preferred hydrocarbon dienes and halohydrocarbon dienes, generically designated as (halo)hydrocarbon dienes, have from 4 to 10 carbon atoms when the diene is acyclic and from 5 to 10 carbon atoms when the diene is alicyclic. Further preferred are acyclic (halo)-hydrocarbon dienes having from 4 to 8 carbon atoms wherein at least one olefinic linkage is terminal. A particularly preferred diene is butadiene.

The halonitrile and diene reactants are employed in any convenient ratio, as an excess of either does not appear to be detrimental to the process of the invention. Molar ratios of halonitrile to diene from about 5:1 to about 1:5 are generally satisfactory, although molar ratios or halonitrile to diene from about 2:1 to about 1:2 are preferred. Frequently, satisfactory results are obtained when the reactants are employed in amounts that are substantially stoichiometric, that is, a molar ratio of halonitrile to diene of about 1:1.

The process of the invention is conducted in liquid phase solution. Solvents that are satisfactory are liquid at reaction temperature and pressure, are capable of dissolving the reactants and are substantially inert towards the halonitrile and diene reactants and the products obtained therefrom. Preferred solvents are polar, that is, contain uneven charge distribution. Illustrative solvents include the alcohols, particularly lower monohydric and polyhydric alkanols such as methanol, ethanol, butanol, tert-butanol, 2-ethylhexanol, glycerol, ethylene glycol and 1,2,6-hexanetriol, as well as the ether-alcohols, e.g., the cellosolves and the carbitols; the lower alkyl nitriles such as acetonitrile, propionitrile and butyronitrile; esters such as ethyl acetate, methyl propionate and propyl butyrate; sulfones such as diethyl sulfone, propyl hexyl sulfone and sulfolane; and N,N-dialkylamides such as dimethylformamide and N,N-diethylacetamide. Preferred solvents comprise the nitriles, especially cyanoalkanes. and particularly preferred as reaction solvent is acetonitrile.

The reaction process is conducted at atmospheric, subatmospheric or superatmospheric pressure so long as the reaction mixture is maintained substantially in the liquid phase. Advantageous use is made of the pressures generated when the reactants are heated to reaction temperature in a sealed reaction vessel, which pressures will be somewhat but not substantially higher than atmospheric pressure. The process of the invention is conducted over a wide range of temperatures. Temperatures from about 50° C. to about 200° C. are generally satisfactory. The optimum reaction temperature will in part depend upon the type of halonitrile reactant employed, particularly upon the number of alphahalogen substituents thereupon. Preferred reaction temperatures when trihaloacetonitrile reactants are employed range from about 75° C. to about 120° C., while the preferred temperature range for the reaction of a α,α-dihalonitriles is from about 100° C. to about 140° C., and best results are obtained when the halonitrile reactant possesses a single α-halogen substituent if temperatures from about 110° C. to about 170° C. are employed.

The process of the invention is conducted by mixing the reactants, solvent and catalyst, and maintaining the reaction mixture at reaction temperature until reaction is complete, typically from about 4 to about 20 hours. The method of mixing is not material. One reactant may be added to the other in increments, as by bubbling a gaseous diene into the mixture of halonitrile, solvent and catalyst, although it is equivalently useful to initially mix the entire amount of reactants. Subsequent to reaction, the product mixture is separated by conventional means, such as by fractional distillation, selective extraction, or crystallization.

The products of the process of the invention are unsaturated nitriles illustratively formed by cleavage of the bond between an alpha-halogen substituent and the alpha carbon atom of the halonitrile reactant and subsequent 1,4-addition of the species thus formed to the conjugated diene. In the case of trihaloacetonitriles, exclusively 1,4-addition is observed, whereas in the case of a α-monohalonitrile and α,α-dihalonitrile reactants, the predominant product arises through 1,4-addition although minor amounts of product arising from 1,2-addition are observed. Illustrative 1,4-addition processes and the products obtained thereby may be classified according to the number of α-halogen substituents on the halonitrile reactant as follows:

(a) addition of an α-mono-halonitrile

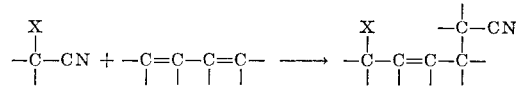

(b) addition of an α,α-dihalonitrile

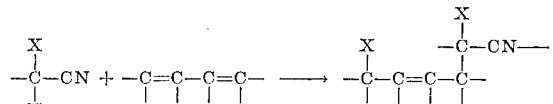

(c) addition of a trihaloacetonitrile

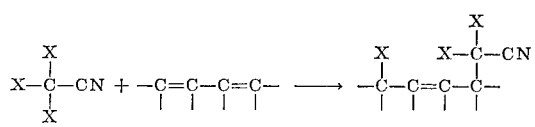

wherein X as the previously stated significance. An illustrative 1,2-addition, the minor reaction process of illustrative Equations (a) and (b) is shown below.

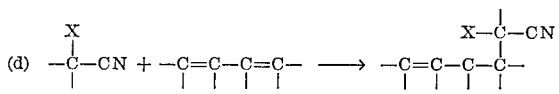

When the preferred dienes and halonitrile reactants are employed, the 1,4-addition products are represented by the formula

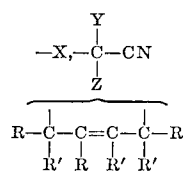

wherein X, Y, Z, R and R' have the previously stated significance. The products of the invention are therefore halohydrocarbenyl nitriles, with an ϵ-halogen substituent and an olefinic linkage γ to the cyano group. The products are further characterized by from 0 to 2 halogen substituents on the carbon atom alpha to the cyano group.

Illustrative products obtained from the 1,4-addition of α-mono-halonitriles are 1-chloro-5-cyana-2-pentene, 1-bromo-5-cyano-2,3-dimethyl-2-hexene, 5-cyano-1,3-dichloro-2-pentene, 3-chloro-6-cyanomethylcyclohexene, 3-bromo-5-(cyanomethyl)cyclopentene, 1-(2-cyanoethyl)-2-(iodomethyl)cyclohexene and 1-chloro-5-cyano-3-methyl-2-pentene.

Exemplary products derived from 1,4-addition of an α,α-dihalonitrile include 5-cyano-1,5-dichloro-2-pentene, 3-bromo-6-(bromocyanomethyl)cyclohexane, 5-cyano-1,5-dichloro-3-methyl-2-pentene, 3-iodo-5-(iodocyanomethyl)cyclopentene, 5-cyano-1,2,3,5-tetrachloro-2-octene and 6-cyano-2,6-dibromo-3-hexene.

When trihaloacetonitrile is reacted with conjugated diene, illustrative products include 5-cyano-1,5,5-trichloro-2-pentene, 5-cyano-3-methyl-1,5,5-tribromo-2-pentene, 5-cyano-1,3,5,5-tetrachloro-2-pentene, 3-bromo-6-(dibromocyanomethyl)cyclohexene, 5-cyano-1,5,5-triiodo-2-pentene and 1-cyano-1,1,5-trichloro-3-nonene.

Because of the reactive nature of the product substituents, particularly the halogen atoms that are allylic to the ethylenic linkage or alpha to the nitrile group, the products of the precess of the invention find utility in a number of applications. Preferred as products, largely because of the greater number and the variety in location of the reactive halogen substituents, are the products derived from the alpha-substituted di- to trihalonitriles, and these ε-halo-α(mono- to dihalo)-γ-alkenyl nitriles are a preferred class of products. These preferred products may be hydrocarbyl, besides the cyano group and the α and ε halogen substituents, or may be halohydrocarbyl, i.e., contain additional halogen substituents, if the diene reactant possessed halogen substituents or if the nitrile reactant possessed halogen substituents other than the halogen(s) attached to the alpha carbon atom. Generically, the preferred products may be designated as ε-halo-α-(mono- to dihalo)-γ-(halo)hydrocarbenyl nitriles.

The compounds of the invention find particular utility as chemical intermediates. The halogen substituents may be reacted with tertiary amines to form useful quaternary ammonium salts, with sodium hydrosulfide to form corresponding thiol derivatives, with alkoxides or phenoxides to form ethers or with salts of carboxylic acids to form esters. The ethylenic linkage is employed as a site for reaction in the formation of polymers or copolymers, or alternatively is epoxidized to form epoxy resin precursors. Alternatively, the cyano substituent is hydrolyzed to the corresponding carboxylic acid, which acids are useful agricultural chemicals, reacted by subsequent conventional methods to form useful ester derivatives, or is reduced to the corresponding amide or amine. The unsaturated halogen-containing nitrile is reacted with strong base to effect dehydrohalogenation, or alternatively may be reacted with ammonia to form amino-acid precursors.

To further illustrate the process of the invention and the products obtained thereby, the following examples are provided. It should be understood that they are not to be regarded as limitations, as the teachings thereof may be varied as will be understood by one skilled in this art.

*Example I*

To a glass tube was charged 2.8 g. of butadiene, 7.2 g. of trichloroacetonitrile, 0.5 g. of ferrous chloride and 10 ml. of acetonitrile. The tube was sealed, maintained overnight at 90° C., and for several hours longer at 110° C. Gas-liquid chromatography indicated a single major product which was isolated in 97% yield based upon a conversion of 44%. The product boiled at 44–48° C. at 0.1 mm., $n_D^{25}$ 1.4948. The nuclear magnetic resonance spectrum of the product was consistent with the structure 5-cyano-1,5,5-trichloro-2-pentene and the infrared spectra contained a band characteristic of —CCl$_2$CN.

*Analysis.*—Calc. for $C_6H_6Cl_3N$: C percent wt. 36.3; H, percent wt. 3.1; Cl, percent wt. 53.7; N, percent wt. 7.1. Found: C, 36.0; H, 3.1; Cl, 53.9; N, 7.1.

Similar results are obtained when ferric chloride is employed as the catalyst.

*Example II*

To a small glass tube was charged 5.6 g. of dichloroacetonitrile, 2.8 g. of butadiene, 0.5 g. of ferrous chloride and 10 ml. of acetonitrile. The tube was sealed and heated at 110–120° C. to yield an amber-colored product mixture. By preparative gas-liquid chromatography, two products were isolated, the higher boiling product being obtained in approximately 8 fold excess over the lower boiling product. The higher boiling product, obtained in an approximately 89% yield based upon a 30% conversion, had a boiling point of 68–70° C. at 0.6 mm., $n_D^{25}$ 1.4920. The nuclear magnetic resonance spectrum of this product was consistent with the structure 5-cyano-1,5-dichloro-2-pentene.

*Analysis.*—Calc. for $C_6H_7Cl_2N$: C, percent wt. 44.0; H, percent wt. 4.3; Cl, percent wt. 43.2. Found: C, 44.3; H, 4.3; Cl, 43.1.

*Example III*

To a glass tube were charged 7.1 g. of chloroacetonitrile, 5.4 g. of butadiene, 1.0 g. of ferrous chloride and 15 ml. of acetonitrile. The reaction tube was sealed and the mixture was maintained overnight at 120° C. By gas-liquid chromatography trapping techniques, two products were isolated, the higher boiling product being obtained in approximately 74% yield based upon a 43% conversion. This product boiled at 232° C., $n_D^{25}$ 1.4720. The nuclear magnetic resonance spectra of this product was consistent with the structure 1-chloro-5-cyano-2-pentene.

*Analysis.*—Calc. for $C_6H_8NCl$: C, percent wt. 55.6; H, percent wt. 6.2; Cl, percent wt. 27.4. Found: C, 55.2; H, 6.3; Cl, 26.7.

*Example IV*

To a glass tube was charged 9.0 g. of trichloroacetonitrile, 5.0 g. of 1,3-cyclohexadiene, 0.5 g. of ferrous chloride and 15 ml. of acetonitrile. The mixture was maintained at 75° C. for approximately 16 hours, during which time it became brownish in color. The product mixture was distilled under reduced pressure to give, inter alia, a fraction boiling at 138–147° C. at 0.4–0.5 mm., $n_D^{25}$ 1.5230. The nuclear magnetic resonance spectrum of this product was consistent with the structure 3-chloro-6-(dichlorocyanomethyl)cyclohexene.

*Analysis.*—Calc. for $C_8H_8Cl_3N$: C, percent wt. 42.8; H, percent wt. 3.6; Cl, percent wt. 47.5. Found: C, 42.4; H, 3.6; Cl, 46.9.

*Example V*

To a glass tube was charged 2.3 g. of chloroprene (50% in xylene), 1.5 g. of dichloroacetonitrile, 0.15 g. ferrous chloride and 5 ml. of acetonitrile. Upon standing overnight at room temperature and three hours at 115–120° C., the product, 1-cyano-1,3,5-trichloro-3-pentene was obtained. This compound has a refractive index, $n_D^{25}$, of 1.5142, B.P. 250° C. with decomposition.

*Example VI*

When trichloroacetonitrile is reacted with isoprene in dimethylformamide solution in the presence of ferrous bromide, a good yield of 5-cyano-3-methyl-1,5-dibromo-2-pentene is obtained.

*Example VII*

When dibromoacetonitrile is reacted with 2,3-dichlorobutadiene in acetonitrile solution in the presence of a catalytic amount of ferrous chloride, a good yield of 5-cyano-1,2,3,5,5-pentachloro-2-pentene is obtained.

We claim as our invention:
1. The compound of the formula

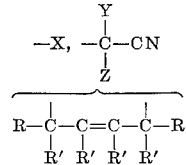

wherein X is halogen of atomic number from 17 to 53 inclusive, Y is hydrogen or X, Z is Y, aliphatic non-acetylenic hydrocarbyl radical of 1 to 8 carbon atoms or aliphatic non-acetylenic halohydrocarbyl radical of 1 to 8 carbon atoms, and R and R' independently are hydrogen, halogen of atomic number from 17 to 53 inclusive, alkyl of 1 to 8 carbon atoms or haloalkyl of 1 to 8 carbon atoms with the proviso that an R and an R' may form a divalent alkylene radical of 1 to 8 carbon atoms.

2. ε-Halo-α-(mono- to dihalo)-γ-methyl-γ-pentenyl nitrile wherein each halogen is halogen of atomic number from 17 to 53 inclusive.

3. ε-Chloro-α-(mono- to dichloro)-γ-pentenyl nitrile.

4. The compound 5-cyano-1,5-dichloro-2-pentene.

5. The compound 5-cyano-1,5,5-trichloro-2-pentene.

6. The compound 5-cyano-3-methyl-1,5,5-trichloro-2-pentene.

7. The process of producing the ε-halo-γ-alkenyl nitrile of the formula

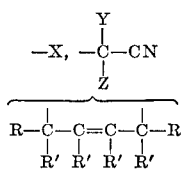

wherein X is halogen of atomic number from 17 to 53 inclusive, Y is hydrogen or X, Z is Y, aliphatic non-acetylenic hydrocarbyl radical of 1 to 8 carbon atoms or aliphatic non-acetylenic halohydrocarbyl radical of 1 to 8 carbon atoms, and R and R' independently are hydrogen, halogen of atomic number from 17 to 53 inclusive, alkyl of 1 to 8 carbon atoms or haloalkyl of 1 to 8 carbon atoms with the proviso that an R and an R' may together form a divalent alkylene radical of 1 to 8 carbon atoms, by reacting in a 1:1 molar ratio and in an essentially 1,4-manner (a) the halonitrile compound of the formula

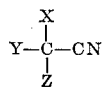

wherein X, Y and Z are as defined hereinabove and (b) the conjugated diene of the formula

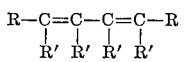

where R and R' are as defined hereinabove, in liquid phase solution in an inert polar solvent, the molar ratio of said halonitrile to said diene being from about 5:1 to about 1:5, at a temperature from about 50° C. to about 200° C., in the presence of from about 0.005 mole to about 0.5 mole per mole of limiting reactant of an iron halide as catalyst.

8. The process of claim 7 wherein said halonitrile compound is mono- to trichloroacetonitrile, said conjugated diene is butadiene, and said iron halide catalyst is ferrous halide.

9. The process of claim 7 wherein said halonitrile compound is mono- to trichloroacetonitrile, said conjugated diene is isoprene and said iron halide catalyst is ferrous chloride.

10. The process of claim 8 wherein said mono- to trichloroacetonitrile is trichloroacetonitrile and said ferrous halide is ferrous chloride.

11. The process of claim 8 wherein said mono- to trichloroacetonitrile is dichloroacetonitrile and said ferrous halide is ferrous chloride.

12. The process of claim 8 wherein said mono- to trichloroacetonitrile is chloroacetonitrile and said ferrous halide is ferrous chloride.

References Cited by the Examiner

UNITED STATES PATENTS 3,239,553   3/1966   Rust et al. _____ 260—465.7

FOREIGN PATENTS 1,058,257   11/1959   Germany.

CHARLES B. PARKER, *Primary Examiner.*

J. P. BRUST, *Assistant Examiner.*